US005129118A

United States Patent [19]

Walmesley

[11] Patent Number: 5,129,118

[45] Date of Patent: Jul. 14, 1992

[54] ACCESSORY TOOL APPARATUS FOR USE ON POWER DRILLS

[76] Inventor: Mark W. Walmesley, 35 River Run, Irvine, Calif. 92714

[21] Appl. No.: 736,782

[22] Filed: Jul. 29, 1991

[51] Int. Cl.[5] .......................... B25F 1/00; B23B 51/12

[52] U.S. Cl. .......................................... 7/158; 7/165; 279/145; 408/239 A

[58] Field of Search ............... 7/158, 165; 408/239 A; 279/1 A, 1 B, 1 R

[56] References Cited

U.S. PATENT DOCUMENTS

| | | | |
|---|---|---|---|
| 2,536,017 | 1/1951 | Bamberger | 279/1 R |
| 3,484,114 | 12/1969 | Rodin | 279/1 R |
| 3,932,904 | 1/1976 | Nilsson et al. | 7/165 |
| 4,525,111 | 6/1985 | Gutsche | 7/158 |
| 4,796,319 | 1/1989 | Taft | 7/158 |

FOREIGN PATENT DOCUMENTS

| | | | |
|---|---|---|---|
| 2137912 | 10/1984 | United Kingdom | 279/1 A |

*Primary Examiner*—Roscoe V. Parker
*Attorney, Agent, or Firm*—Leonard Tachner

[57] ABSTRACT

An improved drill accessory apparatus primarily adapted for selective connection to a power tool such as an electric drill to provide additional functions for such a power tool such as a screwdriving function. The apparatus thereby enables a user to first drill a hole and then drive a screw into that drilled hole with the same tool and without requiring removal of a drill bit first used to drill the hole. More significantly, the present apparatus provides the aforementioned accessory feature while overcoming certain safety disadvantages present in the most relevant prior art. One such safety-directed improvement of the present apparatus is derived from a structural design which uses a spring positioned entirely within a housing thereby precluding safety risks that might otherwise be encountered if an external spring were employed such as that shown in the prior art. Another such safety-based improvement relates to the use of a sleeve which is specifically designed to remain stationary while the remaining structure of the apparatus may rotate at high speed. This feature allows the user to grasp and stabilize the combination of the accessory of the apparatus and the power tool to which it is connected with his free hand without incurring any risk of injury that is presented in the prior art.

9 Claims, 4 Drawing Sheets

ACCESSORY TOOL APPARATUS FOR USE ON POWER DRILLS

BACKGROUND OF THE INVENTION

1. Field of the Invention

The present invention pertains generally to accessories for use on power drills and more specifically, to an accessory apparatus that may be readily attached to a power drill over a drill bit connected therein for providing additional capabilities such as screw driver and wrench-type functions.

2. Prior Art

Attaching an accessory onto the drill bit end of a power drill to provide additional functions such as screwdriving and the like is not per se new. In this respect the most relevant prior art known to the applicant herein is U.S. Pat. No. 3,484,114 to Rodin. Rodin describes the problems solved by such devices wherein he explains that a worker had previously used one power tool to drill a screw-receiving opening then put down the tool and used another power tool or hand tool to drive and install the screw in the opening. Still another power or hand tool must then be used if the screw-receiving opening must be counter-bored. The Rodin patent disclosure illustrates a device which solves this problem by providing an attachment for a power tool which enables a single power tool to be used to drill a screw-receiving opening and to install a screw in the opening. More specifically, Rodin describes an attachment which fits directly over the drill bit of a power drill and which carries a screw-driving blade at its forward end which is driven by the power tool to install the screw.

Unfortunately the Rodin patent disclosure describes a device which while solving the aforementioned problem of using separate tools to drill the hole and then insert the screw, the manner in which the Rodin attachment is secured to the power tool and the fact that there is no non-rotating portion of his attachment once it is so secured and the power tool is activated, renders the Rodin attachment relatively unsatisfactory from the standpoint of safety. One of the safety problems associated with this prior art device stems from the fact that connection of this attachment to the power tool depends upon the use of at least one pin the position of which is controlled by an externally exposed spring which is in a constant state of tension and which is rotated at a high rate of speed along with the attachment. A structural failure of the spring is entirely plausible in view of the repeated movement of the spring due to the interaction between the spring and the connecting pins. Such a failure could result in a release of the spring in which one or more portions of it, depending upon the nature of the failure thereof, could be whirled at high speed in a radial direction from the attachment and readily injure the user. Another safety problem associated with the aforementioned prior art is the fact that the entire attachment, including all external surfaces thereof, rotate with rotation of the power tool chuck. Consequently, the user cannot steady the screwdriver or other such tool within the attachment while it is being used. Any attempt by the user to grasp the exterior surface of the attachment, which is an entirely natural tendency to align the attachment with a screw for example, could seriously injure the user such as by a friction burn of the fingers or a fracture or break of bones in the hand or wrist or by a complete loss of control of the power tool which could result in even more serious injury.

Still another safety concern in regard to the Rodin disclosure relates to dimensional tolerances. More specifically, the Rodin attachment apparatus does not allow for variations in the diameter of the chuck and a slightly smaller chuck diamter could permit inadvertent and hazardous separation of the apparatus from the power tool.

There is therefore still a need to provide an attachment of the type previously described, but which overcomes the aforementioned safety disadvantages thereof while retaining the essential convenience of being able to use a power tool attachment such as for driving screws and the like which may be inserted over the drill bit of a power drill or comparable portions of similar power tools.

SUMMARY OF THE INVENTION

The aforementioned need is satisfied by the present invention which in an exemplary preferred embodiment disclosed herein provides an attachment accessory for power tools such as power drills and the like. Like the previously described prior art, the invention may be readily inserted onto the chuck of a power drill over the drill bit therein to provide additional functions for the tool such as driving a screw into a hole previously created by the power drill and without requiring the user to use separate tools or to remove the drill bit and insert a screwdriver bit. However, in addition to the aforementioned advantages described herein, the present invention solves the safety problems associated with such prior art by providing a novel, quick connect and disconnect power drill interface which obviates the prior art requirement for the use of exposed springs. Furthermore, the present invention provides a novel structure which includes an external sleeve which is not subject to the rotational torque of the drill to which the accessory of the present invention is connected. Instead, this sleeve may be safely grasped by the user's hand to steady and accurately control the position of the power tool and the accessory of the present invention attached thereto without incurring any safety hazards as previously described.

More specifically, the present invention uses a plurality of steel balls such as ball bearings, one for each of the plurality of indentations typically found in a conventional chuck of a power drill to align and stabilize the attachment of the present invention with the power drill rotating member. An internally positioned spring normally positions these steel balls relative to the remaining structure of the apparatus of the present invention so that they cannot be released from such indentations without the application of a tension-directed force against the internally positioned spring. The structure then allows the balls to exit the indentations thereby permitting release of the accessory apparatus of the invention from the power drill. Because the spring portion of the present invention is located entirely within the structure of the accessory herein disclosed, even with a drastic failure of the spring, neither portions of the spring nor the balls or any other part of the accessory apparatus of the invention can fly away from the rotating structure and thus injury of the aforementioned description is precluded in the invention herein. Furthermore, the ball bearing design provides automatic centering of the power drill chuck relative to the apparatus to provide secure interconnection for even slightly smaller chuck diameters.

In addition, the structure of the present invention provides an external sleeve or handle of a cylindrical shape preferably made of plastic. This sleeve is designed to slip when grasped so that it remains stable and in a non-rotating configuration which allows the user to grasp the attachment with his free hand to stabilize the combination of power drill and attachment without running the risks of injury described previously for the prior art.

An additional feature of the present invention, while not directed specifically to the safety concerns described above, is an added convenience feature which allows the screwdriver tool or other similar tool to be inserted into the attachment of the present invention without requiring tightening and loosening of a screw as described in the aforementioned prior art patent. In the present invention and specifically in the preferred embodiment described herein as exemplary thereof, a magnet is used to hold the screwdriver tool or other such tool in place within the attachment in a releasable configuration that does not require the use of a screw to hold a driving bit in place.

OBJECTS OF THE INVENTION

It is therefore a principal object of the present invention to provide an accessory apparatus for use in conjunction with power tools such as power drills and the like and which provides added convenience and function to such power tools, but without incurring the aforementioned safety hazards of the prior art.

It is an additional object of the present invention to provide a screwdriver attachment apparatus for use with a power drill wherein the means for attaching the apparatus to the power drill does not require the use of any externally exposed springs which could otherwise result in significant injury to the user in the event of structural failure of the spring.

It is still an additional object of the present invention to provide a screwdriver attachment apparatus for use with a power drill wherein an external sleeve of the apparatus is provided to permit the user to grasp the apparatus without risk of injury by permitting the sleeve to remain in a non-rotation configuration despite high speed rotation of the apparatus upon activation of the drill.

It is still an additional object of the present invention to provide an improved accessory apparatus designed for attachment to the chuck of a power tool such as a power drill wherein interconnection between the apparatus and the drill is facilitated by a centering structure comprising a plurality of steel ball bearings designed to mate with the indentations in the conventional chuck of a drill, such ball bearings being selectively releasable from such indentations by axial compression of a helical spring located entirely within the structure of the invention.

BRIEF DESCRIPTION OF THE DRAWINGS

The aforementioned objects and advantages of the present invention as well as additional objects and advantages thereof will be more fully understood hereinafter as a result of a detailed description of a preferred embodiment when taken in conjunction with the following drawings in which.

DETAILED DESCRIPTION OF A PREFERRED EMBODIMENT

Figures 1, 6:
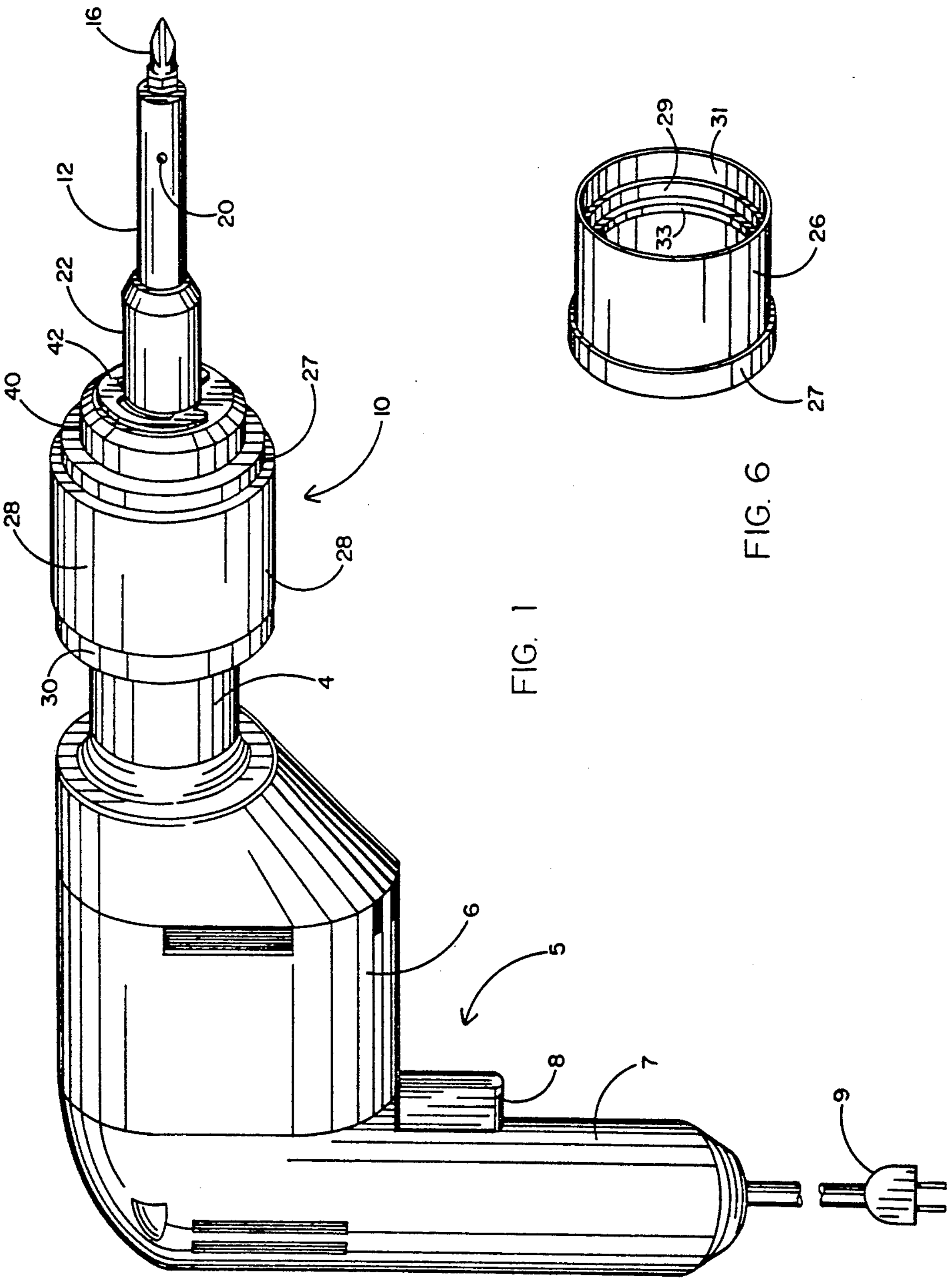
FIG. 1 is a three-dimensional illustration of the accessory apparatus of the present invention shown installed on a conventional power drill.
FIG. 6 is an alternative isometric view of a component of the present invention, which view illustrates the structure thereof which controls the position of the ball bearings for attachment of the invention to a power tool.
Figure 2:
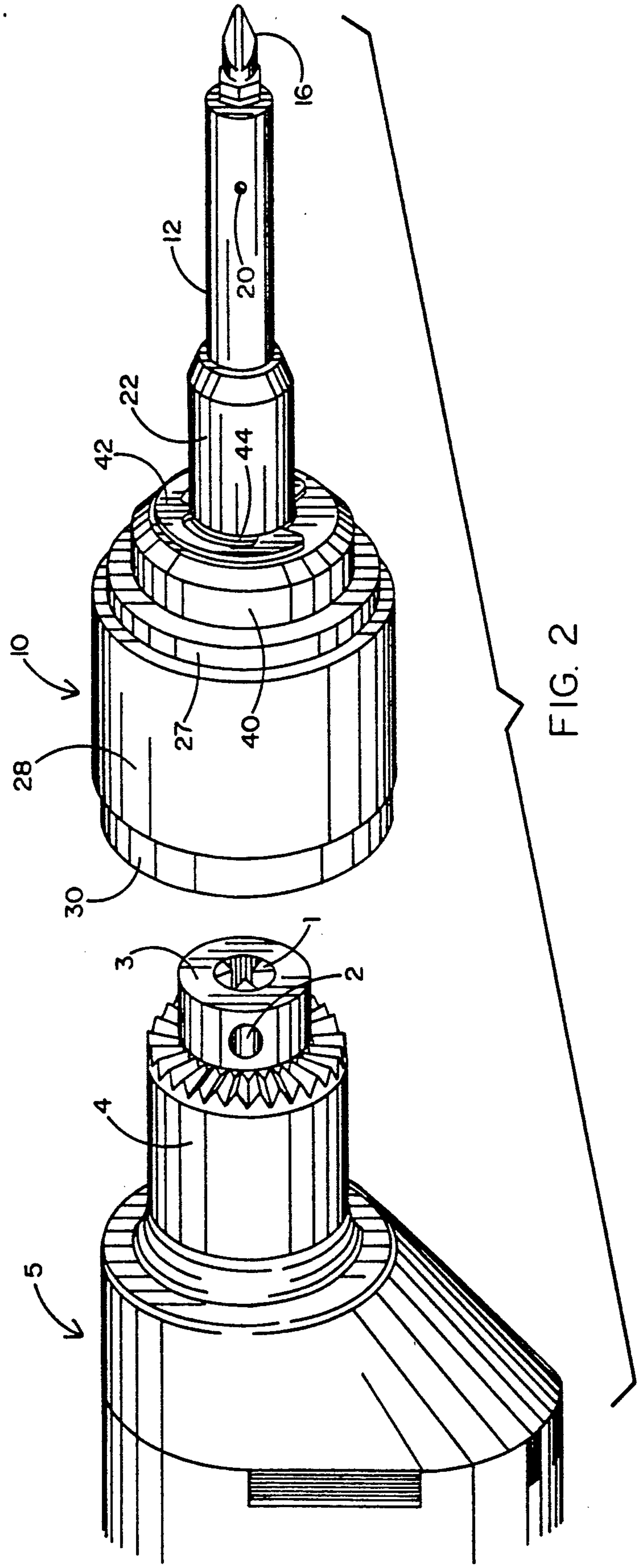
FIG. 2 is a three-dimensional view of the accessory apparatus withdrawn from the power drill.
Figure 4:
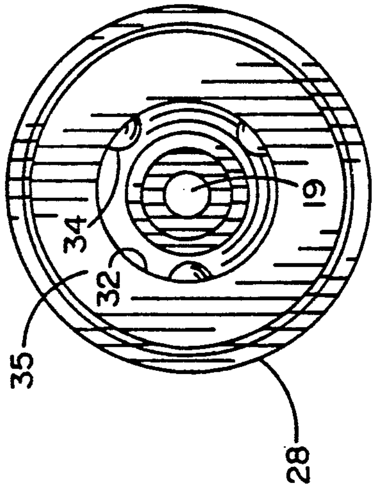
FIG. 4 is a rear elevational view of apparatus of the present invention.
Figure 3:
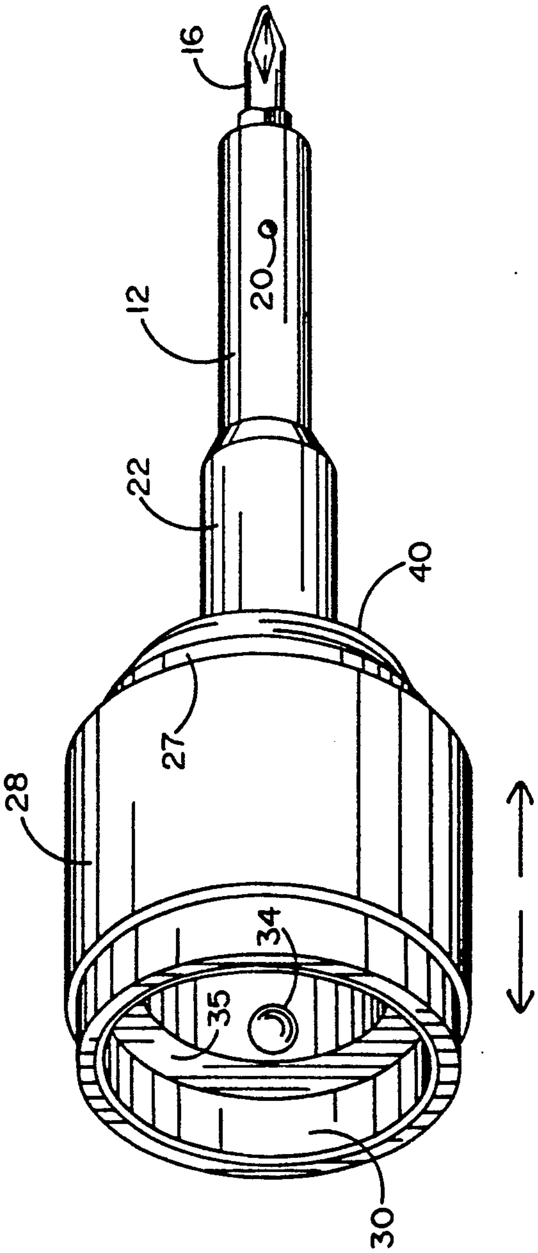
FIG. 3 is a three-dimensional rear view of the apparatus of the present invention.

Referring to FIGS. 1 and 2 it will be seen that the drill accessory apparatus 10 of the present invention is designed to be releasably mated to a conventional electric drill 5 of the type having a plurality of teeth 1 for holding a drill bit (not shown). The relative position of the teeth is controlled by a cylinder 3 of a conventional chuck 4 which may be loosened or tightened in a well-known manner by employing a plurality of indentations 2, typically by means of a chuck key (also not shown). The drill may have a conventional drill body 6, a handle 7 which includes a trigger switch 8 and may be powered by an AC cord and plug 9. It will be understood that the drill 5 is shown herein by way of illustration only and does not part of the present invention. It will also be understood that the accessory apparatus 10 of the present invention may be used in conjunction with virtually any power tool of the type having a chuck 4 with indentations 2 for controlling a plurality of teeth 1 in the manner shown best in FIG. 2. Therefore the apparatus of the present invention is not to be limited to the particular power tool or specific electric drill shown herein by way of illustration only.

Figure 5:
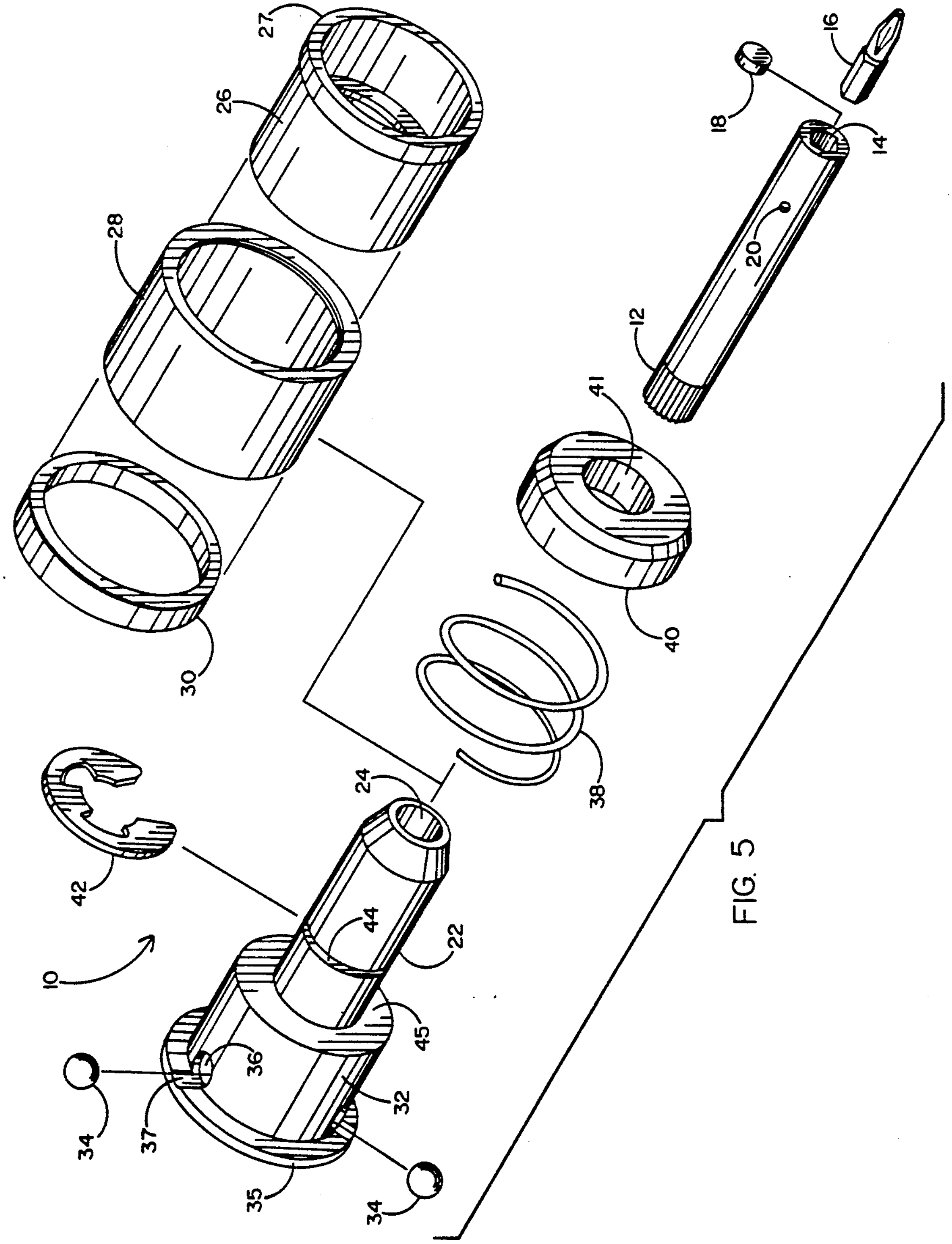
FIG. 5 is an exploded isometric view of the present invention illustrating each of the various components thereof in position for assembly of the invention.

Referring now additionally to FIGS. 3–6, it will be seen that the drill accessory apparatus 10 of the present invention comprises a tool holder shaft 12, one end of which provides a socket 14 adapted to receive a tool 16 which may for example be a screwdriver tool bit shown in the accompanying drawings. In preferred embodiment of the invention, a magnet 18 seen in FIG. 5 is positioned within the tool holder shaft 12 and secured therein by means of an indentation 20. Magnet 18 may be positioned on a shelf 19 (see FIG. 4) within the shaft 12.

Tool holder shaft 12 mates with a shank 22, the latter having a channel 24 for that purpose. The end of tool holder shaft 12 that is designed to mate with the shank 22, may be optionally serrated to further secure the shaft 12 and the shank 22. Shank 22 extends integrally from a ball holder 32 which, in the preferred embodiment, provides one end from which a radially extending flange 35 is integrally connected. Next to flange 35 there are provided three symmetrically spaced ball sockets 36 adjacent to which the flange 35 provides respective ball races 37 to control the movement of a plurality of balls 34 in a radial direction from the respective ball sockets 36. Ball holder 32 terminates at the shank end with a shoulder 45 from which the shank extends. Shank 22 is provided with a slot 44 which is adapted to receive a spring clip 42 for securin9 the thereof.

Ball holder 32 receives a spring housing 26 which has a flange 27 at one end thereof. A sleeve or handle 28 of cylindrical configuration, is designed to overlay spring housing 26 wherein sleeve 28 and housing 26 have relative dimensions which permit the rotation of the sleeve relative to the housing or as will be seen hereinafter permit the sleeve 28 to remain stationary while spring housing 26 rotates with the chuck 4 of the electric drill 5. A locking member 30 of annular configuration is designed to secure housing 26 within the sleeve 28 by means of a frictional press fit arrangement while permitting the relative rotation between the sleeve and the housing as previously described.

The assembly formed by housing 26, sleeve 28, and locking member 30 is designed to overly the ball holder 32 and integral flange 35 thereof. It will be seen hereinafter that the relative position of spring housing 26 and ball holder 32 controls limited radial movement of the balls 34 to either secure or permit release of the accessory apparatus 10 from the chuck 4 and specifically the indentations 2 of the chuck for rapid engagement or disengagement therefrom. For this purpose a spring 38 is provided and is adapted to fit concentrically within the spring housing 26 at the flange 27 end of the housing. A cap member 40 is designed to overly and compress the spring 38 and is provided with a hole 41 which is of appropriate dimension to contiguously encircle the shank 22 between the slot 44 and the shoulder 45 when secured therebetween by means of spring clip 42.

The axial length of helical spring 38 is selected relative to the dimensions of the other components of apparatus 10 so that the spring is in a relatively low state of axial compression when the apparatus 10 is secured to a power tool. However the axial length of spring 38 permits further compressive action thereof which changes the relative position of the spring housing 26 and the ball holder 32 to permit disengagement of the apparatus 10 and a power tool. More specifically, with spring 38 in its least compressed mode, the relative positions of the flange 35 of ball holder 32 and the locking member 30 is that shown in FIG. 3. However, when sleeve 28 is forced axially in a direction toward the tool 16 it engages the flange 27 which thereby moves the spring housing 26 in the same direction, shortening the distance between the flange 35 and the end of locking member 30.

The effect of this change in relative positions of the ball holder 32 and spring housing 26 may be understood best by referring to FIG. 6 which illustrates the interior end of spring housing 26 adapted to mate with the locking member 30, but with the locking member removed. As shown in FIG. 6, the interior of spring housing 26 provides an annular ball retention surface 29, an annular ball release surface 31 and a spring support shelf 33. Shelf 33 is designed to engage one end of spring 38 so that movement of the spring housing 26 compresses the spring. Furthermore, such movement also changes the position of annular surfaces 29 and 31 relative to the balls 34.

More specifically, when spring 38 is in its least compressed configuration, the balls engage annular ball retention surface which has a smaller inner diameter than annular ball release surface 31. This smaller inner diameter prevents the balls 34 from moving in a radially outward direction relative to ball holder 32 and thus forces the balls 34 to extend through their respective ball sockets 36 in the manner shown best in FIGS. 3 and 4. However, when the spring housing 26 is moved in an axial direction toward for example tool 16 as viewed in FIG. 3, annular ball release surface 31 displaces annular ball retention surface 29. Because of the larger inner diameter of annular surface 31, the balls are free to move in a radially outward direction from their respective ball sockets 36. Such radially directed movement of the ball 34, permits relative motion between the accessory apparatus 10 and a power tool such as electric drill 5 and specifically, relative motion between the balls 34 and the indentations 2 of such a power tool so that the apparatus 10 can be either installed on or removed from the electric drill 5. Of course, such movement of the balls 34 is along the respective ball race 37 of the flange 35 as seen best in FIG. 5 so that the radial movement of the balls is controlled to be within this race 37 which thus prevents any displacement of the respective balls 34 from the axis of radial movement to which they are constrained.

Thus it will be seen that the manner in which the present invention provides for selective interconnection between the accessory apparatus 10 and a power tool, depends upon the relative compression of a helical spring which is entirely enclosed within a spring housing. Thus, despite repeated attachment to and disengagement from a power drill or other power tool, the spring of the present invention does not constitute a safety hazard even though it may ultimately experience structural failure. Thus the present invention provides a significant safety improvement as compared to the aforementioned prior art. Furthermore, it will be seen that the present invention provides a sleeve which is designed to remain stationary relative to the remaining structure of the apparatus so that it may be grasped by the user for purposes of stabilizing the combined power drill and accessory apparatus without incurring any safety hazards that may be encountered by grasping the rotating exterior surface of the prior art device. The novel structure of the present invention thus provides unique safety improvements as compared to the most relevant prior art while still affording the relatively advantageous function of adapting a power tool to alternative functions without requiring the use of separate tools and without requiring removal of a drill bit from the power drill or other power tool before attachment of the accessory apparatus thereto.

It will now be understood that what has been disclosed herein comprises an improved drill accessory apparatus primarily adapted for selective connection to a power tool such as an electric drill to provide additional functions for such a power tool such as a screwdriving function. The apparatus thereby enables a user to first drill a hole and then drive a screw into that drilled hole with the same tool and without requiring removal of a drill bit first used to drill the hole. More significantly, the present invention provides the aforementioned accessory feature while overcoming certain safety disadvantages present in the most relevant prior art. One such safety-directed improvement of the present invention is derived from a structural design which uses a spring positioned entirely within a housing thereby precluding safety risks that might otherwise be encountered if an external spring were employed such as that shown in the prior art. Another such safety-based improvement relates to the use of a sleeve which is specifically designed to remain stationary while the remaining structure of the invention may rotate at high speed. This feature allows the user to grasp and stabilize the combination of the accessory of the invention and the power tool to which it is connected with his free hand without incurring any risk of injury that is presented in the prior art.

Those having skill in the art to which the present invention pertains will now, as a result of the applicant's teaching herein, perceive various modifications and additions which may be made to the invention. By way of example, the specific manner in which the present invention is designed to be connected to a power tool may be altered while still retaining the safety-directed improvements thereof such as those specifically described herein. Accordingly, all such modifications and additions are deemed to be within the scope of the invention which is to be limited only by the claims appended hereto and their equivalents.

I claim:

1. An apparatus for attachment to an electric drill for providing at least one additional tool therefor, the apparatus of the type being selectively attached to the chuck holes of the drill, without requiring removal of a drill bit therein, for rotation of a tool-holding shaft by the drill; the apparatus comprising:

a plurality of balls, each such ball configured for at least partial entry into a respective chuck hole of said drill;

a ball holder of a hollow, generally cylindrical shape and having a first end for holding said shaft and a second end having sockets for holding said balls against adjacent said chuck holes;

a housing positioned in coaxial surrounding engagement with the exterior radial surface of said ball holder, the relative axial positions of said housing and said ball holder determining the radial position of said balls within said sockets; and a spring positioned within said housing for resisting relative axial motion between said housing and said ball holder, a first compression position of said spring corresponding to a radial position of said balls for locking said balls into said chuck holes and a second compression position of said spring corresponding to a radial position of said balls for releasing said balls from said chuck holes; and a circumferential sleeve positioned in surrounding radial engagement with said housing and adapted for slippage relative to said housing upon activation of said drill for stabilizing said apparatus by the grasping of a non-rotating portion thereof.

2. An apparatus for attachment to an electric drill for providing at least one additional tool therefor, the apparatus of the type being selectively attached to the chuck holes of the drill, without requiring removal of a drill bit therein, for rotation of a tool-holding shaft by the drill; the apparatus comprising:

a plurality of balls, each such ball configured for at least partial entry into a respective chuck hole of said drill;

a ball holder of a hollow, generally cylindrical shape and having a first end for holding said shaft and a second end having sockets for holding said balls against adjacent said chuck holes;

a housing positioned in coaxial surrounding engagement with the exterior radial surface of said ball holder, the relative axial positions of said housing and said ball holder determining the radial position of said balls within said sockets; and a spring positioned within said housing for resisting relative axial motion between said housing and said ball holder, a first compression position of said spring corresponding to a radial position of said balls for locking said balls into said chuck holes and a second compression position of said spring corresponding to a radial position of said balls for releasing said balls from said chuck holes; and a magnet in said shaft for selective retention of a tool therein.

3. An apparatus for attachment to an electric drill for providing at least one additional tool therefor, the apparatus of the type being selectively attached to the chuck holes of the drill, without requiring removal of a drill bit therein, for rotation of a tool-holding shaft by the drill; the apparatus comprising:

a plurality of balls, each such ball configured for at least partial entry into a respective chuck hole of said drill;

a ball holder of a hollow, generally cylindrical shape and having a first end for holding said shaft and a second end having sockets for holding said balls against adjacent said chuck holes;

a housing positioned in coaxial surrounding engagement with the exterior radial surface of said ball holder, the relative axial positions of said housing and said ball holder determining the radial position of said balls within said sockets; and a spring positioned within said housing for resisting relative axial motion between said housing and said ball holder, a first compression position of said spring corresponding to a radial position of said balls for locking said balls into said chuck holes and a second compression position of said spring corresponding to a radial position of said balls for releasing said balls from said chuck holes; and wherein said shaft is serrated for increased frictional engagement with said first end of said ball holder.

4. An apparatus for attachment to an electric drill for providing at least one additional tool therefor, the apparatus of the type being selectively attached to the chuck holes of the drill, without requiring removal of a drill bit therein, for rotation of a tool-holding shaft by the drill; the apparatus comprising:

a plurality of balls, each such ball configured for at least partial entry into a respective chuck hole of said drill;

a ball holder of a hollow, generally cylindrical shape and having a first end for holding said shaft and a second end having sockets for holding said balls against adjacent said chuck holes;

a housing positioned in coaxial surrounding engagement with the exterior radial surface of said ball holder, the relative axial positions of said housing and said ball holder determining the radial position of said balls within said sockets; and a spring positioned within said housing for resisting relative axial motion between said housing and said ball holder, a first compression position of said spring corresponding to a radial position of said balls for locking said balls into said chuck holes and a second compression position of said spring corresponding to a radial position of said balls for releasing said balls from said chuck holes.

5. The apparatus recited in claim 4 further comprising a magnet in said shaft for selective retention of a tool therein.

6. The apparatus recited in claim 4 wherein said spring comprises a helix.

7. The apparatus recited in claim 4 wherein said shaft is serrated for increased frictional engagement with said first end of said ball holder.

8. An apparatus for attachment to an electric drill for providing at least one additional tool therefor, the apparatus of the type being selectively attached to the chuck holes of the drill, without requiring removal of a drill bit therein, for rotation of a tool-holding shaft by the drill; the apparatus comprising:

a plurality of balls, each such ball configured for at least partial entry into a respective chuck hole of said drill;

a ball holder of a hollow, generally cylindrical shape and having a first end for holding said shaft and a second end having sockets for holding said balls against adjacent said chuck holes;

a spring-biased exterior housing having means for controlling the respective radial positions of said balls for selective locking and unlocking said balls relative to said chuck holes depending upon the relative axial position of said housing and said ball holder; and a stabiizing sleeve positioned along the exterior radial surface of said housing and adapted for rotational slippage relative to said housing for grasping of said apparatus during rotation of said drill.

9. An apparatus for attachment to an electric drill for providing at least one additional tool therefor, the apparatus of the type being selectively attached to the chuck holes of the drill, without requiring removal of a drill bit therein, for rotation of a tool-holding shaft by the drill; the apparatus comprising:

a plurality of balls, each such ball configured for at least partial entry into a respective chuck hole of said drill;

a ball holder of a hollow, generally cylindrical shape and having a first end for holding said shaft and a second end having sockets for holding said balls against adjacent said chuck holes;

a spring-biased exterior housing having means for controlling the respective radial positions of said balls for selective locking and unlocking said balls relative to said chuck holes depending upon the relative axial position of said housing and said ball holder; and a magnet in said shaft for selective retention of a tool therein.

* * * * *